(12) United States Patent
Garrard

(10) Patent No.: US 7,686,000 B2
(45) Date of Patent: Mar. 30, 2010

(54) CONTROLLER AND METHOD FOR CONTROLLING AN IGNITION COIL

(75) Inventor: Michael R. Garrard, Chelmsford (GB)

(73) Assignee: Freescale Semiconductor, Inc., Austin, TX (US)

( * ) Notice: Subject to any disclaimer, the term of this patent is extended or adjusted under 35 U.S.C. 154(b) by 34 days.

(21) Appl. No.: 12/067,590

(22) PCT Filed: Sep. 21, 2005

(86) PCT No.: PCT/EP2005/010317

§ 371 (c)(1),
(2), (4) Date: Mar. 20, 2008

(87) PCT Pub. No.: WO2007/038945

PCT Pub. Date: Apr. 12, 2007

(65) Prior Publication Data

US 2008/0202485 A1   Aug. 28, 2008

(51) Int. Cl.
*F02P 3/05* (2006.01)

(52) U.S. Cl. .................. 123/644; 123/609; 123/652

(58) Field of Classification Search .................. 123/594, 123/609, 644, 652
See application file for complete search history.

(56) References Cited

U.S. PATENT DOCUMENTS

| 4,198,936 | A | 4/1980 | Pagel et al. | |
| 4,298,941 | A | 11/1981 | Furuhasi | |
| 4,303,977 | A | 12/1981 | Kobashi et al. | |
| 4,347,570 | A | 8/1982 | Akiyama et al. | |
| 4,479,479 | A | 10/1984 | Domland et al. | |
| 5,623,912 | A * | 4/1997 | Kelly | 123/644 |
| 6,100,728 | A | 8/2000 | Shreve et al. | |
| 6,188,224 | B1 | 2/2001 | Hannoyer et al. | |
| 6,272,428 | B1 | 8/2001 | Heath et al. | |
| 6,595,192 | B1 | 7/2003 | Haussmann et al. | |
| 6,750,565 | B2 | 6/2004 | Degen et al. | |
| 6,883,508 | B2 * | 4/2005 | Geoffroy | 123/644 |
| 2006/0213489 | A1 * | 9/2006 | Moran et al. | 123/651 |

FOREIGN PATENT DOCUMENTS

| EP | 0272946 B1 | 1/1994 |
| EP | 0846858 A1 | 6/1998 |
| EP | 0881382 B1 | 9/2002 |
| FR | 2820465 A1 | 8/2002 |
| WO | 9730287 A1 | 8/1997 |

* cited by examiner

*Primary Examiner*—Stephen K Cronin
*Assistant Examiner*—Anthony L Bacon

(57) ABSTRACT

A controller for an ignition coil, the controller comprising means for determining a rate of change of current flow through a primary winding of the ignition coil; and means for switching off current flow through the primary winding of the ignition coil as a function of the rate of change of current.

19 Claims, 2 Drawing Sheets

CONTROLLER AND METHOD FOR CONTROLLING AN IGNITION COIL

FIELD OF THE INVENTION

The present invention relates to a controller and method for controlling an ignition coil.

BACKGROUND OF THE INVENTION

Modern automotive ignition systems typically rely on an ignition coil to generate spark energy, where the spark energy is used by a spark plug to generate an ignition spark in an engine cylinder, thereby initiating fuel combustion.

Generally speaking the greater the spark energy produced the better fuel will combust, thereby increasing the reliability of cold starts, plus more stable combustion and more stable idle.

To allow spark energy to be generated requires the energization of an ignition coil, where the energization of an inductive ignition coil is typically controlled by the provision of a control signal to a coil current switching element that is arranged to allow current to flow through a primary winding of the ignition coil during the energization phase. The spark energy is generated when the control signal to the coil current switching element causes the flow of current through the primary winding to stop.

The spark energy generated by an inductive ignition coil is determined by the magnetic flux of the ignition coil, which in turn is determined by the inductance of the ignition coil and the current flow through the primary winding of the ignition coil at the point current flow is stopped.

However, with the constant drive to reduce the cost and weight of automobiles the ignition coil, and in particular the iron core of the ignition coil, has inevitably been reduced in size and weight and as a consequence the maximum amount of magnetic flux that inductive ignition coils can now produce has consequently also been reduced.

Consequently, to maximise the spark energy produced by an ignition coil it is desirable to increase the current flow through the ignition coil to the point where the iron core of the ignition coil is saturated, thereby maximising magnetic flux. The time period over which current flow through the ignition coil occurs is commonly called dwell time.

If the current flow through the primary winding of the ignition coil is insufficient to saturate the iron core the magnetic flux, and consequently spark energy, is reduced from its maximum value by the square of the difference between actual current flow and current flow required for saturation.

An increase in the flow of current beyond saturation will have no additional effect on spark energy as magnetic flux will not increase beyond its saturation point. However, an increase in current flow beyond saturation can result in excessive current flow through the coil current switching element, which can result in damage to the coil current switching element and/or to the ignition coil itself.

Various solutions for determining optimum current flow have been proposed. For example, direct measurement of the current rise through the coil until it reaches a predetermined threshold with a resulting dwell time is a long standing solution (for example U.S. Pat. No. 4,198,936). However, this has at least four drawbacks: firstly the current threshold is fixed by component values which have to be adjusted for each subsequent ignition system; secondly the current threshold must always be set conservatively to accommodate variation in the magnetic flux capability of the ignition coil; thirdly it is an expensive solution because it relies on an accurate means to measure said current; and fourthly there is no mechanism to compensate for speed variation during the dwell cycle. Ignition systems aim to deliver the spark energy at a particular crank angle. Since ignition controllers typically work in time, the controller will convert this future angle into a future time. Any engine speed change subsequent to commencement of dwell will result in an angle error for the ignition event unless the controller changes the dwell time to compensate for the engine speed change. If the dwell time is changed then the coil current will not be optimum.

Improvements have been made, for example U.S. Pat. No. 6,750,565 describes a time extrapolation method that is based on a measured current threshold significantly lower than that for maximum flux. This eliminates the first of the above four problems but still suffers from the second, third and fourth problem.

U.S. Pat. No. 6,595,192B1 eliminates the current measuring circuitry through modelling of the appropriate dwell time as a function of battery voltage: this eliminates the first and third problems but still suffers from the second and fourth problem.

U.S. Pat. No. 6,100,728 uses current limiting hardware to hold the current to a known value. This eliminates the fourth problem as the target current can be reached and held until the ignition event is due to occur. However, this still suffers from the first, second and third problems and in addition incurs significant heat dissipation in the switching element for the period when the current is held.

Additionally, a further requirement of a modern ignition system is to provide diagnostic feedback in order to comply with emissions legislation. The prior art systems provide limited diagnostics.

Accordingly, it is desirable to provide a solution that allows optimisation of current flow through an ignition coil during energization of the ignition coil irrespective of operating conditions.

SUMMARY OF THE INVENTION

In accordance with an aspect of the present invention there is provided a controller and method for controlling an ignition coil according to the accompanying claims.

This provides the advantage of allowing an ignition coil to be controlled to generate spark energy when close to the magnetic flux saturation point of the ignition coil irrespective of variations in temperature, battery voltages, wiring resistances, coil manufacture and other variable associated with an ignition system. That is, the current threshold does not have to be either predetermined or conservative, it is optimised by the invention.

This has the further advantage of eliminating the need for expensive current measurement hardware and allow the use of current limiting hardware at low cost, while allowing accurate current control in spite of speed variations during the dwell cycle.

BRIEF DESCRIPTION OF THE DRAWINGS

An embodiment of the invention will now be described, by way of example, with reference to the drawings, of which.

DETAILED DESCRIPTION OF THE PREFERRED EMBODIMENTS

Figure 1:
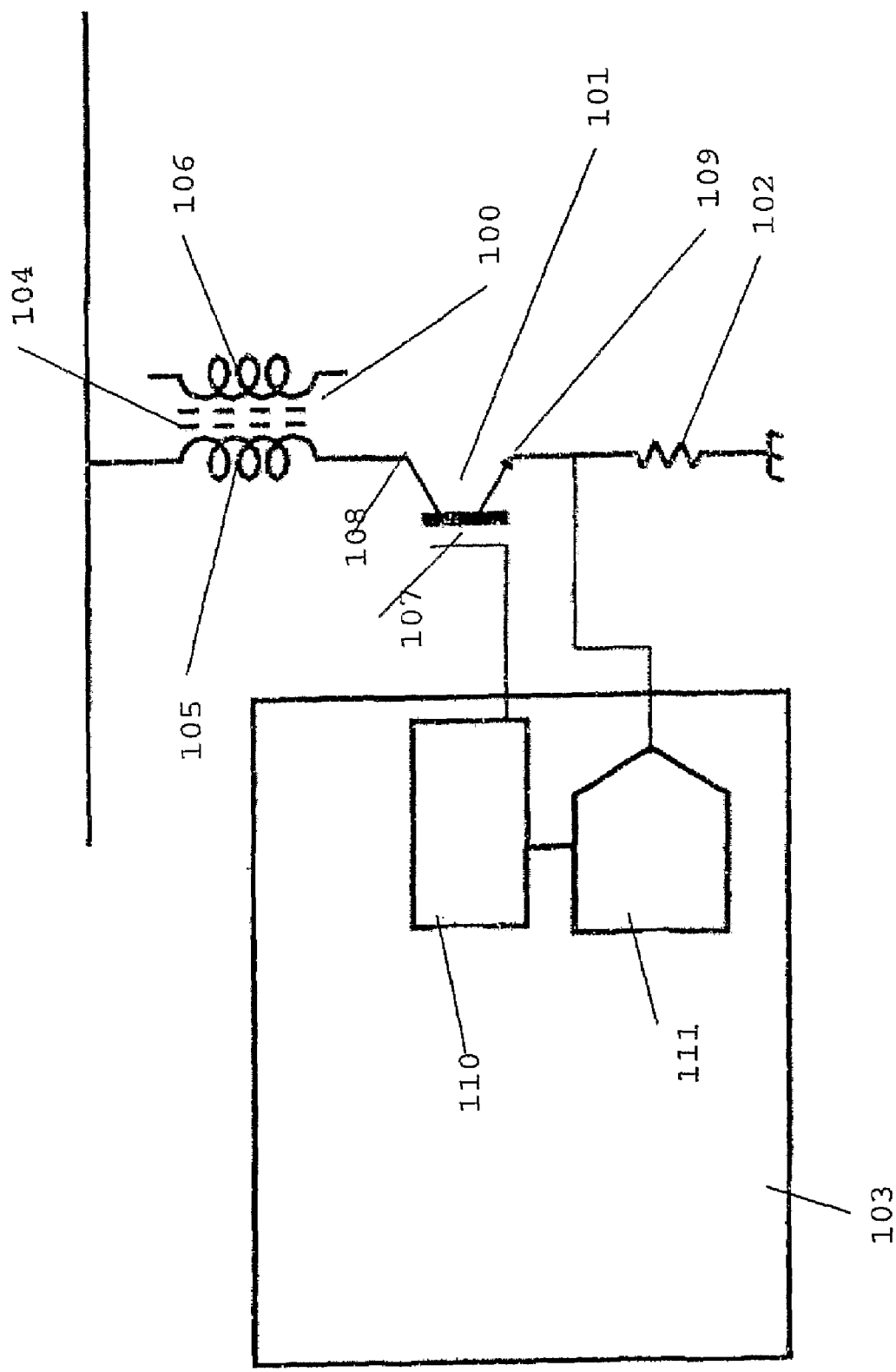
FIG. 1 illustrates a controller according to an embodiment of the present invention.

FIG. 1 shows an inductive ignition coil 100, a switch element 101, a resistor 102 and a controller 103.

The inductive ignition coil 100 includes an iron core 104, a primary winding 105 and a secondary winding 106, where one end of the primary winding 105 is coupled to a battery supply voltage.

The switch element 101, which in this example is an IGBT transistor having a gate 107, collector 108 and an emitter 109, has the collector 108 coupled to the other end of the ignition coil primary winding 105 to that of the battery supply voltage. The emitter 109 of the switch element 101 is coupled to a reference voltage, for example ground, via the resistor 102, where the resistor 102 acts as a current sensing resistor, thereby allowing the current flow through the primary winding 105 to be measured.

Although the above described switch element 101 is shown as an IGBT transistor, as would be appreciated by a person skilled in the art any suitable switch element could be used, for example an NPN transistor, PNP transistor or a FET transistor.

The controller 103 includes a logic element 110, for example a processor or a series of gates, and an analogue to digital converter ADC 111.

An output from the logic element 110 is coupled to the base 107 of the switch element 101 to allow control of current through the switching element 101.

An input to the logic element 110 is coupled to an output from the ADC 111, with an input of the ADC 111 being coupled to a voltage reference point formed between the transistor emitter 109 and the resistor 102.

The inductive ignition coil 100 is arranged to generate spark energy in response to current flow being stopped through the primary winding 105 of the inductive ignition coil 100. The spark energy is generated in the secondary winding 106 where the magnitude of the spark energy is determined by the magnetic flux formed in the iron core 104, which in turn is determined by the inductance of the ignition coil 100 and the current flow through the primary winding 105 of the ignition coil 100 at the point current flow through the primary winding 105 is stopped.

As described in detail below the logic element 110 of the controller 103 is arranged to monitor current flow through the ignition coil primary winding 105 and is configured to control the switch element 101 to stop the flow of current through the primary winding 105 based on monitored changes in the current flow. In particular, the logic element 110 is arranged to stop current flow through the primary winding 105 upon the logic element 110 recognising that the rate of change in current flow has increased indicating that magnetic flux saturation of the iron core 104 has occurred; or based upon a dwell time or dwell angle established during prior ignition cycles through recognition of the same change in current flow. The prior ignition cycles that show clearly the change in rate of increase in current might be due to deliberate extension of the dwell time or simply due to the natural speed fluctuations during the dwell time that occur in an internal combustion engine.

In operation, during the energization phase of the ignition coil 100, the logic element 110 is arranged to turn on the switching element 101 by setting the gate 107 of the switching element 101 high causing current to flow from the battery (not shown) through the primary winding 105 of the ignition coil 100, through the switch element 101 to ground via the resistor 102.

As the current flow increases the voltage across the resistor 102 correspondingly increases in proportion.

The ADC 111 is arranged to sample the analogue voltage value of the voltage at the voltage reference point, and correspondingly the current flow through the primary winding 105.

The sampled voltage values at the voltage reference point, and correspondingly current flow, are provided in digital form by the ADC 111 to the logic element 110. The digital form will typically be an electrical representation of a binary number having at least a number of digits suitable for identifying the required change in current flow.

The logic element 110 is arranged to monitor the variation in voltage at the voltage reference point, and correspondingly current, with time.

As the switch element 101 is closed the ignition coil 100 opposes the voltage formed across the primary winding 105 with its inductive reactance, thereby limiting the current flow through the primary winding 105 and causing magnetic flux in the iron core 104 to increase.

Figure 2:
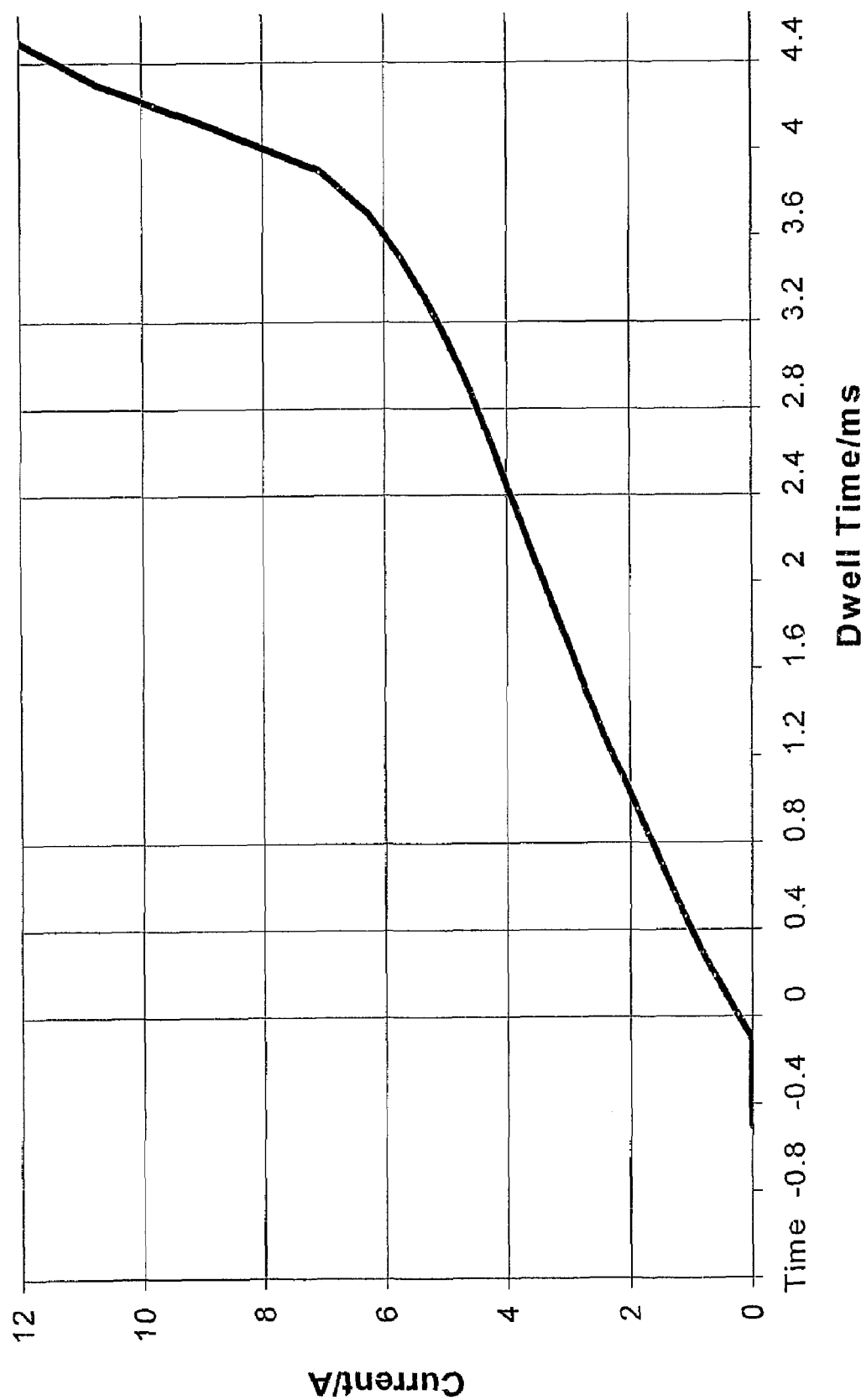
FIG. 2 illustrates a typical charge curve of an ignition coil.

Consequently, as shown in FIG. 2, initially the rate of increase in current through the primary winding 105 is relatively constant with the inductive reactance of the ignition coil 100 limiting the rate of increase of current flow. Although not shown in FIG. 2, in addition to the increase in current there is a corresponding increase in magnetic flux of the iron core 104. As stated above the logic element 110 is arranged to monitor the rate of increase in current via the sampled voltage information provided by the ADC 111.

However, if or when magnetic flux saturation of the iron core 104 occurs no or little additional inductive reactance will result from an increase in current flow. Consequently, upon magnetic flux saturation occurring the rate of change in current flow through the primary winding 105 will increase.

The logic element 110 is arranged to monitor the rate of change of current flow through the primary winding 105 and is preconfigured with a threshold value for an increase in rate of change of current flow, for example this may be a certain percentage increase in rate of change. As such, when the logic element 110 recognises an increase in rate of change above the threshold value, which will typically occur approximately at the point magnetic flux saturation has occurred, the logic element 110 is arranged to turn the switch element 101 off causing the flow of current through the primary winding 105 to stop and, as stated above, for the magnetic flux to cause a voltage to form across the secondary winding 106, which corresponds to the spark energy of the ignition coil 100.

Although the above embodiment describes a method for determining the saturation point based on a percentage increase in current flow, other techniques could equally be used. For example, the threshold might be set against a mathematical function of the current, such as a differential. Alternatively, a range of thresholds might be used depending upon a combination of other variables such as modelled coil temperature. Equally, a range of different current curves could be stored in memory (not shown) which are used by the logic element 110 as reference curves for mapping changes in current to determine changes in current flow that would indicate saturation point.

As the logic element 110 is arranged to determine magnetic flux saturation based on rate of change in current flow rather than based on absolute current values this has the advantage of allowing the detection of magnetic flux saturation to automatically accommodate variations such as temperature, battery voltage, coil manufacture and wiring resistance. In this way the problems of variations in ignition systems and optimisation of coil current are addressed.

Further, by using rate of change in current flow rather than absolute current values the resistor 102, which acts as a current sensing resistor, need not be a high precision resistor. Additionally, as an ADC is typically integrated on the same silicon that forms the controller 103 the use of the ADC for determining the change in rate of current does not require additional expense.

Further, an additional diagnostic tool resulting from the determination of rate of increase in current is the identification not only of open circuit or short circuit systems but also subtle faults such as a faulty ignition coil with low inductance.

It will be apparent to those skilled in the art that the disclosed subject matter may be modified in numerous ways and may assume embodiments other than the preferred forms specifically set out as described above. One example being that the resistor 102 could be removed and the switching element 101 used as a current sensing resistor with the ADC 111 being coupled to a voltage sensing point located between the primary winding 105 and the collector 108 of the switching element 101.

Using this connection point a high voltage representation proportional to the spark voltage is, at the time of the spark event, present. However, the ADC can be protected from this using a voltage clamp, or alternatively the ADC could be arranged to read this voltage. If the ADC is arranged to read the spark voltage further diagnostics are possible, for example identification of an open in the high tension circuit or lack of spark event (i.e. a misfire).

A second example could be that the output from the controller is arranged to be analogue not digital or alternatively the controller could have two outputs to the switch device, one digital and one analogue. The digital to analogue converter (DAC) required is commonly achieved using a Pulse Width Modulation digital output, followed by a resistor-capacitor filter. With a single analogue output, the output might be used to allow the current to ramp up to the desired level and then to hold it at that level. With two outputs, the analogue one might be used to define a current limit for use by a switch element capable of limiting the current itself, with the digital output defining the dwell time. In this way the aforementioned advantages can be combined with a current limiting strategy.

The invention claimed is:

1. A controller for an ignition coil, the controller comprising:
    means for determining a rate of change of current flow through a primary winding of the ignition coil; and
    means for switching off current flow through the primary winding of the ignition coil as a function of an increase in the rate of change of current.

2. A controller according to claim 1, wherein the means for switching is responsive to the increase in rate of change of current for an increase in current exceeding a threshold.

3. A controller according to claim 1, wherein the function of the increase in the rate of change of current includes a target dwell time determined from at least a previous rate of change of current.

4. A controller according to claim 3, wherein the function of the rate of change of current includes an increase in the rate of change of current exceeding a threshold value.

5. A controller according to claim 3, wherein the means for switching is responsive to the increase in rate of change of current for an increase in current exceeding a threshold.

6. A controller according to claim 1, wherein the function of the rate of change of current includes an increase in the rate of change of current exceeding a threshold value.

7. A controller according to claim 6, wherein the threshold value is based on a predetermine percentage increase in current flow through the primary winding of the ignition coil.

8. A controller according to claim 6, wherein the means for switching is responsive to the increase in rate of change of current for an increase in current exceeding a threshold.

9. A controller according to claim 1, wherein the means for switching includes a switch coupled between the primary winding of the ignition coil and a reference voltage.

10. A controller according to claim 9, wherein the analogue to digital converter is arranged to be coupled to a voltage sensing point located between the switch and the primary winding, whereby the impedance of the switch produces the voltage sensed by the analogue to digital converter in response to the current through the primary winding.

11. A controller according to claim 9, wherein the analogue to digital converter is arranged to be coupled to a voltage sensing point located between the switch and a resistor, wherein the resistor is placed between the switch and the reference voltage.

12. A controller according to claim 1, further comprising means for determining the current flow through the primary winding of the ignition coil.

13. A controller according to claim 12, wherein the means for determining a rate of change of current includes a processor for determining the rate of change of current based on current flow information provided by the means for determining the current flow.

14. A controller according to claim 12, wherein the means for determining the current flow includes an analogue to digital converter arranged to be coupled to a voltage sensing point located between the primary winding of the ignition coil and a reference voltage.

15. A controller according to claim 14, wherein the analogue to digital converter is arranged to convert analogue voltage information into corresponding digital information to allow the voltage information to be processed by the processor for the determination of current flow through the primary winding of the ignition coil.

16. A controller according to claim 14, wherein the information from the analogue to digital converter is examined for diagnosis of primary circuit faults.

17. A method for controlling an ignition coil, the method comprising:
    determining a rate of change of current flow through a primary winding of the ignition coil; and
    switching off current flow through the primary winding of the ignition coil in response to a function of an increase in the rate of change of current.

18. A method according to claim 17, wherein the function of the rate of change of current is an increase in the rate of change of current exceeding a threshold value.

19. A controller according to claim 17, wherein the function of the rate of change of current includes a target dwell time determined from at least a previous rate of change of current.

* * * * *